June 29, 1965     MIYOSHI SUZUE     3,191,606

STALK-DISCHARGING MEANS OF HARVESTING MACHINE

Filed Oct. 21, 1963     2 Sheets-Sheet 2

INVENTOR.
Miyoshi Suzue
BY
Stevens, Davis, Miller & Mosher
ATTORNEYS

3,191,606
STALK-DISCHARGING MEANS OF HARVESTING MACHINE
Miyoshi Suzue, 1343-1 Higashisaki, Nangoku-shi, Kochi-ken, Japan
Filed Oct. 21, 1963, Ser. No. 317,641
Claims priority, application Japan, Oct. 25, 1962, 37/47,709
4 Claims. (Cl. 130—6)

The present invention relates to a stalk-discharging means of harvesting machine, particularly the stalk-discharging means discharging only stalks out of the machine with taking grains off successively from corn stalks in the throw-in type thresher means which cut off corn stalks and feed them to a threshing part.

As corn stalks are fed rapidly into the threshing chamber in this throw-in type thresher means, it is necessary that corn stalks are threshed speedily and successively in the threshing chamber, threshed grains passed through the grading wire nettings and moved to a grading chamber, and only stalks are discharged out of the machine after threshing perfectly "sasari" grains. The term "sasari grains" means those grains which have not been separated from the stalks and which are ready to be discharged from the machine along with the stalks.

The present invention is characterized by that, in the harvesting machine, the stalk-discharging means comprises a threshing chamber having a corn-stalks feeding port on the side wall and a grading wire netting or grading concave on the bottom, a threshing cylinder revolving in the direction from the feeding port to the grading concave in the threshing chamber, a stalk-discharging cylinder revolving on the same revolving center and in opposite direction with the threshing cylinder, a stalk-discharging outlet provided on the threshing chamber over the stalk-discharging cylinder and a discharging tube connecting the stalk-discharging outlet and a suction port of impellers.

The invention will be readily understood from the following description taken together with the accompanying drawings in which:

FIG. 1 is the feeding inlet side view and FIG. 2, the discharging outlet side view.

Figure 1:
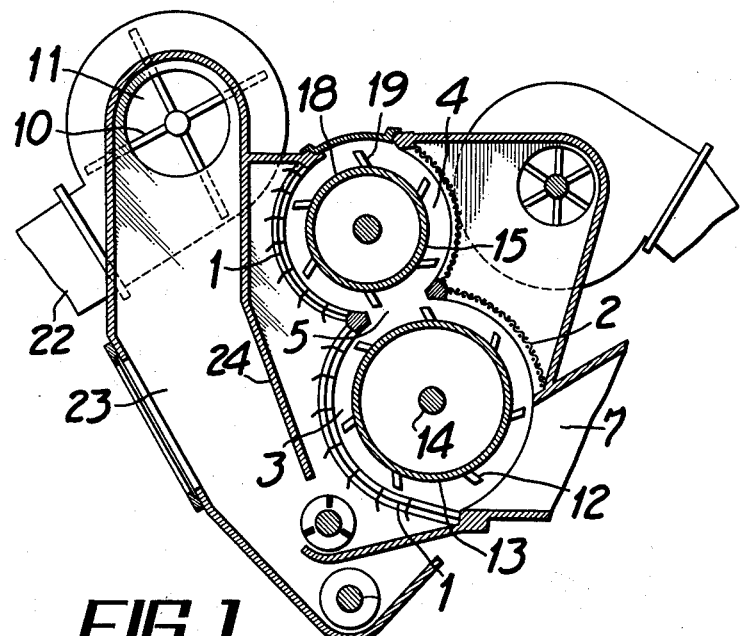
FIG. 1 and FIG. 2 show longitudinal sectional side view of a threshing part of a harvesting machine with stalk-discharging means of a preferred embodiment of this invention, especially
Figure 2:
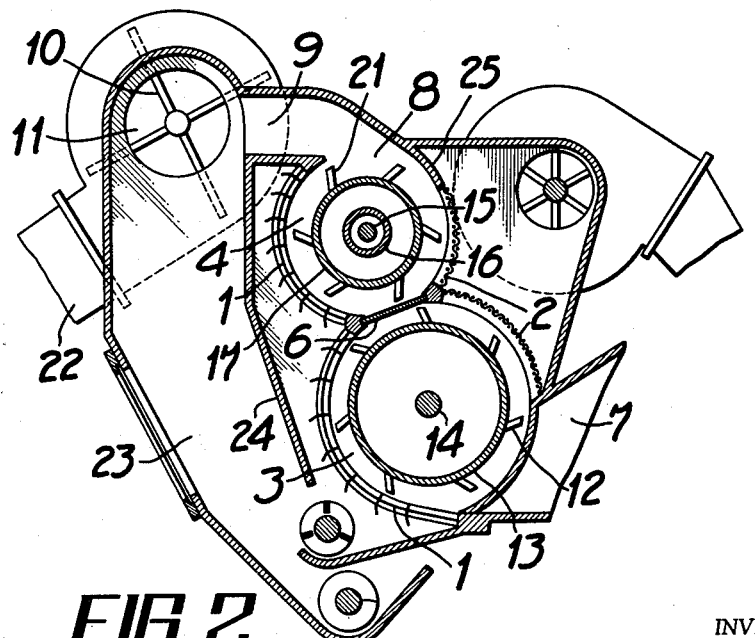
Figure 3:
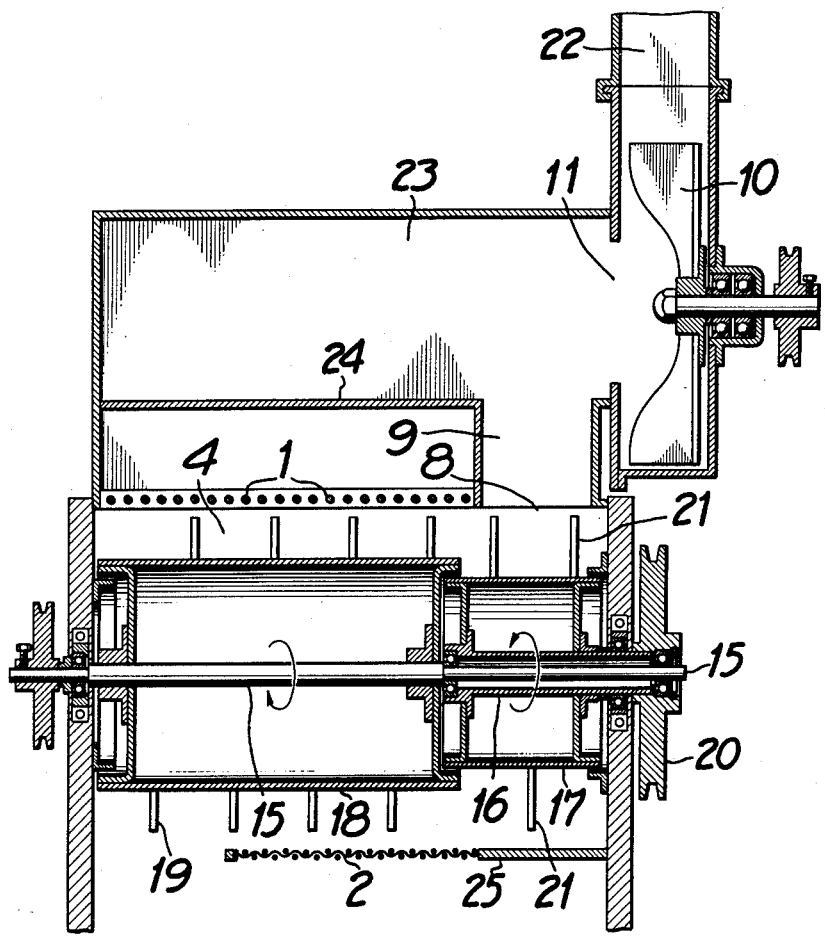
FIG. 3 shows longitudinal sectional front view.

Referring to FIG. 1 and FIG. 2, the stalk-discharging means of the invention comprises a first threshing chamber 3 having a corn-stalk feeding inlet 7 and a second threshing chamber 4 having a stalk-discharging outlet 8, which are enclosed by grading wire nettings or grading concaves 1 for passing grains on the back and ventilative wire netting 2 on the front, and partitioned by a partition wall 6 having a feeding port 5. The stalk-discharging outlet 8 is connected to a suction port 11 and a grading chamber 23, under vacuum produced by impellers 10 for discharging chaff and dust out of the machine, through a discharging tube 9.

In the first threshing chamber 3, the first threshing cylinder 13 having threshing teeth 12 for feeding corn-stalks to the second threshing chamber 4 is mounted on a shaft 14.

The second threshing chamber 4 has two cylinders, the second threshing cylinder 18 and a stalk-discharging cylinder 17 on the same revolving centre. The second threshing cylinder 18 having threshing teeth 19 on its surface is mounted on a shaft 15 and revolves in the same revolving direction with the threshing cylinder 13 in order to feed stalks from the feeding port 5 to the grading concave 1. The stalk-discharging cylinder 17 is mounted on a tubular shaft 16 journalled on the shaft 15 in the side of the stalk-discharging outlet 8 and revolved in opposite revolving direction with the second threshing cylinder 18 by a pulley 20 fitted on the tubular shaft 16. Threshing teeth 19 are secured on the second threshing cylinder 18 to guide stalks toward the stalk-discharging cylinder 17. The stalk-discharging cylinder 17 has discharging teeth 21 on its surface being suitable for discharging stalks.

The numeral 22 shows a blast pipe for discharging stalks drawn in by the impellers 10 out of the machine. The numeral 24 is a plate for partitioning the back side of grading concaves 1 and the grading chamber 23. The numeral 25 designates a plate extending from the ventilative wire netting 2 under the discharging outlet for effecting stalk-discharging of threshing teeth 21.

As the means of the invention are constructed as mentioned above, corn stalks cut off underneath ears are fed from the feeding inlet 7 of the first threshing chamber 3 and threshed by the threshing teeth 12 of the first threshing cylinder 13 and the grading concave 1. After that, they are moved into the second threshing chamber 4 through the feeding port 5. In the second chamber 4, they are threshed again by the threshing teeth 19 of the second threshing cylinder 18 and the grading concave 1. After completion of threshing, grains and chaff are passed through the grading concaves 1 and guided to the grading chamber 23 by the plate 24. As the second threshing cylinder 18 and the stalk-discharging cylinder 17 are revolving in opposite directions from each other, "sasari" grains are taken off perfectly from stalks when they move from the cylinder 18 to the cylinder 17. Therefore, only stalks having ears completely stripped are discharged by high speed revolution of the discharging teeth 21 of the cylinder 17. They pass the discharging tube 9 through the outlet 8 and are discharged speedily and successively by the impellers 10 out of the machine.

What I claim is:

1. A stalk discharging means for a harvesting machine comprising a threshing chamber, a threshing cylinder rotatably mounted therein, a stalk discharging cylinder rotatably mounted in said chamber coaxially with the threshing cylinder, and means for rotating said discharging cylinder in a direction opposite to the direction of rotation of the threshing cylinder.

2. A device as in claim 1 further including a discharge conduit connected to the threshing chamber adjacent the discharging cylinder.

3. A device as in claim 2 further including means for producing a vacuum in said conduit.

4. A device as in claim 3 wherein the means for producing the vacuum comprises an impeller rotatably mounted in the conduit.

References Cited by the Examiner
UNITED STATES PATENTS

| | | | |
|---|---|---|---|
| 470,639 | 3/92 | Eastham | 130—27.5 |
| 932,889 | 8/09 | McMillin | 130—6 |
| 1,137,100 | 4/15 | Watts | 130—6 |
| 1,736,775 | 11/29 | Ayers | 130—27.17 |
| 2,173,605 | 9/39 | Edwards | 130—27 |
| 3,038,476 | 6/62 | Andersen | 130—27.14 |

ANTONIO F. GUIDA, *Acting Primary Examiner.*
T. GRAHAM CRAVER, *Examiner.*